Dec. 7, 1926.  W. F. BROWN  1,609,458
SIPHON DEVICE
Filed July 10, 1925
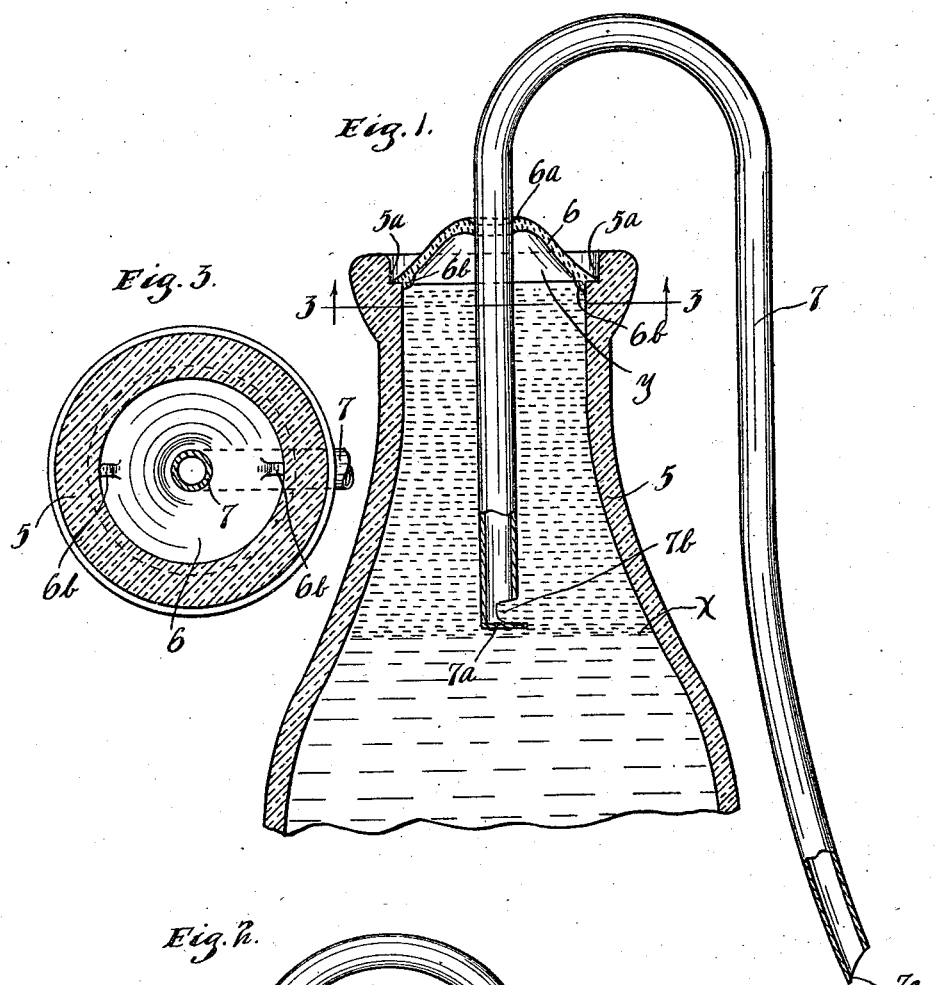
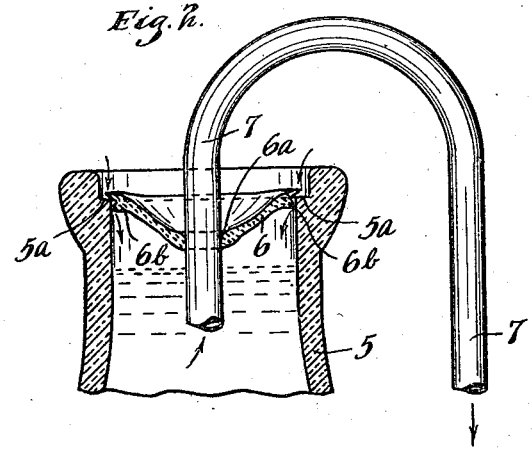
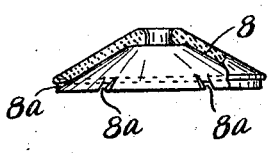
INVENTOR.
WALTER F. BROWN.
BY HIS ATTORNEYS.

Patented Dec. 7, 1926.

1,609,458

UNITED STATES PATENT OFFICE.

WALTER FRANK BROWN, OF MINNEAPOLIS, MINNESOTA, ASSIGNOR OF ONE-HALF TO JOSIAH E. BRILL, OF MINNEAPOLIS, MINNESOTA.

SIPHON DEVICE.

Application filed July 10, 1925. Serial No. 42,763.

This invention relates to siphon devices and especially to those adapted to be employed in separating the cream from the milk contained in the ordinary commercial milk bottle.

The main object of this invention is to provide an exceedingly simple but highly efficient siphoning device adapted to be readily used on standard milk bottles and to automatically start the siphon action when fitted in the mouth of the bottle. The invention, though especially adapted for use in connection with milk bottles, is, of course, capable of wide general use in liquid receptacles of all classes.

It is a more specific object of the invention to provide such a device having in combination a bent conduit having its delivery end extended below its receiving end and a flexible diaphragm adapted to closely fit the mouth of a bottle or receptacle operative when depressed to start the action of the siphon.

A further object of the invention is to provide in such a siphoning device simple means for admitting air to the interior of the receptacle after the siphon action has been started, thereby permitting the contents of the receptacle to be drained down to the level of the receiving end of the conduit.

These and other objects will be apparent from the following description made in connection with the accompanying drawings, wherein like characters refer to similar parts throughout the several views, and in which, Fig. 1 is a fragmentary vertical section of a standard milk bottle having the siphoning device mounted therein, in position to be depressed;

Fig. 2 is a similar vertical section after the flexible diaphragm employed has been depressed;

Fig. 3 is a horizontal cross section taken on the line 3—3 of Fig. 1; and

Fig. 4 is a view mostly in vertical section of a modified form of diaphragm.

In the drawings, a standard milk bottle is illustrated by the numeral 5 having the peripheral flange $5^a$ in the sides of its mouth. The bottle is illustrated as being filled with milk to the level X and with cream to the level Y, the cream usually extending from the top of the bottle to about one-third of the height thereof.

In the preferred embodiment of the device illustrated, a flexible annular diaphragm 6, of concavo convex construction, is employed. This diaphragm is usually made of rubber, but may, of course, be constructed of metal or other flexible material. The diaphragm 6 is adapted to closely fit the mouth of bottle 5 engaging tightly the peripheral flange $5^a$, when in normal position. The edges $6^a$ of the annular diaphragm about the aperture therethrough are purposely rounded to permit the diaphragm to be easily and gradually reversed or depressed when subjected to a downward pressure. A substantially U-shaped conduit 7, having legs of unequal length, is adjustably supported by and passed through diaphragm 6, the shorter leg of said conduit being adapted to extend below the level of the liquid within the bottle 5, preferably to a point adjacent the lower level of the cream. The lower end $7^a$ of the shorter leg of conduit 7 is closed, but a receiving opening $7^b$ is provided in the side thereof, the purpose being to prevent the milk from being drawn when the action of the siphon is started. The delivery end of conduit 7, of course, extends on the outside of the bottle and is provided with a point $7^c$ adapted to pierce the usual milk bottle stopper to facilitate the removal of the same from the bottle. Radially spaced depending lugs or tits $6^b$ project from the under side of diaphragm 6 adjacent the outer peripheral edge thereof, engaging the sides of the mouth of the bottle 5 just below the flange $5^a$, being adapted to press against said sides when the diaphragm is forced downwardly to depressed position, thereby slightly raising a portion of the contacting edge of diaphragm 6 to permit a small amount of air to gain access to the interior of the bottle.

The modified form of diaphragm illustrated in Fig. 4 comprises a concavo convex annular member 8 provided with a plurality of small recesses or grooves $8^a$ adjacent the inner peripheral edge thereof, said grooves or recesses permitting the access of air to the interior of the bottle when the diaphragm has been depressed.

The operation of the device will probably be obvious from the foregoing description, but may be briefly summarized as follows:—

The stopper of the milk bottle or other receptacle being lifted by means of the pointed end of conduit 7, the diaphragm supporting the conduit is fitted into the mouth of the bottle, as shown in Fig. 1, tightly contacting the peripheral flange 5ᵃ. The diaphragm is then depressed by pushing downwardly on the elbow portion of the conduit, causing the diaphragm to assume the position shown in Fig. 2. The depression of diaphragm 6 causes increased pressure to be exerted on the contents of bottle 5, being sufficient to force a small amount of liquid through the conduit 7, thereby starting the siphon action. The outer sides of lugs 6ᵇ, with the undersides of the diaphragm edge, afford recesses or seats conforming to the shape of the annular groove in the neck of milk bottle 5. When the diaphragm 6 has assumed the depressed position, illustrated in Fig. 2, the depending lugs 6ᵇ, pressing against the sides of the mouth of bottle 5, cause the edges of the diaphragm to be puckered slightly, affording small recesses for the entrance of air into the bottle. Such is necessary, in order that the action of the siphon may continue and the cream be drained. It will readily be seen that the action of the modified form of diaphragm shown in Fig. 4 is similar to that of the preferred form, permitting the access of air into the bottle when the diaphragm has been pushed to depressed position.

It will be apparent from the foregoing description that the applicant has invented an extremely simple self-starting siphon device comprising only two parts and capable of being manufactured at little cost.

Extensive actual usage has shown the device to be highly successful for the purposes intended.

It will, of course, be understood that various changes may be made in the form, details, proportions and arrangement of parts without departing from the scope of the invention.

What is claimed is:—

1. A siphon device having in combination a flexible diaphragm adapted normally to fit the mouth of a bottle or other receptacle, air-tight, a siphon tube passing through said diaphragm with its shorter leg adapted to extend into the contents of said bottle and means on the under side of said diaphragm normally engaging the peripheral edge at the inner side of the mouth of said receptacle and adapted to re-act against said edge when said diaphragm is flexed downwardly whereby a portion of said diaphragm will be lifted from engagement with the mouth of said receptacle to admit air to said receptacle.

2. A siphon device having in combination a depressible member shaped normally to fit in a recess in the mouth of a receptacle and engage the inner edge of said recess to form an air-tight seal, a siphon tube passing through said member with its shorter leg adapted to extend into the contents of said receptacle, circumferentially spaced means adjacent the peripheral edge of said depressible member normally engaging the inner side of the recess in the mouth of said receptacle and extending downwardly along said inner side, said means being adapted to re-act against said inner side to lift said peripheral edge to permit air to be admitted to said receptacle when said member is depressed.

3. A siphon device having in combination a flexible diaphragm adapted normally to fit the mouth of a bottle or other receptacle, air-tight, a siphon tube passing through said diaphragm with its shorter leg adapted to extend into the contents of said receptacle and a depending lug adjacent the peripheral edge of said diaphragm adapted to engage the inner side of the mouth of said receptacle whereby a portion of said peripheral edge will be puckered to admit air into said receptacle when said diaphragm is depressed.

4. A siphon device having in combination a concavo-convex diaphragm adapted to normally fit the mouth of a receptacle air-tight, and provided with a central aperture therethrough, a siphon tube passing through said aperture and snugly fitting the edges of said diaphragm thereabout, said edges or shoulders about said aperture being rounded and slightly depressed to permit said diaphragm to roll to reverse position when pressed downwardly.

5. The combination with a receptacle having internally flanged mouth, of a siphon device comprising a diaphragm normally adapted to fit the flanged portion of said receptacle mouth air-tight, a siphon tube passing through said diaphragm with its shorter leg extending within said receptacle and depending means on the under side of said diaphragm engaging the vertical sides of said flanged mouth whereby the peripheral edge of said diaphragm will be lifted from engagement with said flange when said diaphragm is depressed.

In testimony whereof I affix my signature.

WALTER FRANK BROWN.